United States Patent [19]

Backlund et al.

[11] 4,407,477

[45] Oct. 4, 1983

[54] TIEDOWN FASTENING DEVICE

[75] Inventors: Jonathan C. Backlund, Palo Alto; Eugene F. Duval, Woodside, both of Calif.

[73] Assignee: Fafco, Inc., Menlo Park, Calif.

[21] Appl. No.: 176,345

[22] Filed: Aug. 8, 1980

[51] Int. Cl.³ ............................................. F16M 13/00
[52] U.S. Cl. .................. 248/499; 24/135 A
[58] Field of Search ............ 248/67.5, 499, 505; 403/215; 24/135 A, 135 R

[56] References Cited

U.S. PATENT DOCUMENTS

| 418,369 | 12/1889 | Huff | 24/135 R X |
|---|---|---|---|
| 753,398 | 3/1904 | Hunt | 248/67.5 |
| 1,370,544 | 3/1921 | Leeper | 24/135 R |
| 2,912,213 | 11/1959 | Krystosek | 248/499 |
| 2,915,267 | 12/1959 | Kaysing | 248/67.5 |
| 2,935,553 | 5/1960 | Showman | 248/67.5 X |
| 3,246,076 | 4/1966 | Stoneburner | 248/67.5 X |
| 3,325,127 | 6/1967 | Doskocil | 248/499 |
| 3,572,414 | 3/1971 | Onvfer | 411/270 |

FOREIGN PATENT DOCUMENTS

| 463819 | 6/1951 | Italy | 403/215 |
|---|---|---|---|
| 760533 | 10/1956 | United Kingdom | 248/67.5 |

*Primary Examiner*—William H. Schultz
*Attorney, Agent, or Firm*—Flehr, Hohbach, Test, Albritton & Herbert

[57] ABSTRACT

A device for fastening down one section of a strap, cord or the like is disclosed herein. This device which is especially suitable for use in the installation of solar panels includes a base member to be fixedly attached to a given support structure, for example a roof, and a cap disengageably connected with the base member in a predetermined way. The base and cap include confronting surface segments which cooperate with one another for engaging and retaining the strap or cord section in a fixed position along a path having a plurality of bends, preferably four 90° bends.

13 Claims, 9 Drawing Figures

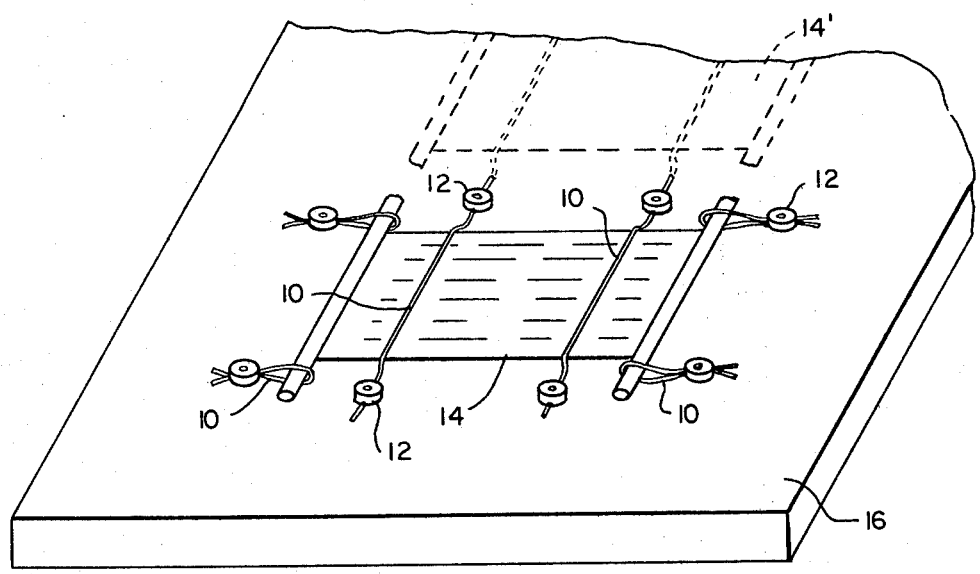
FIG.—1
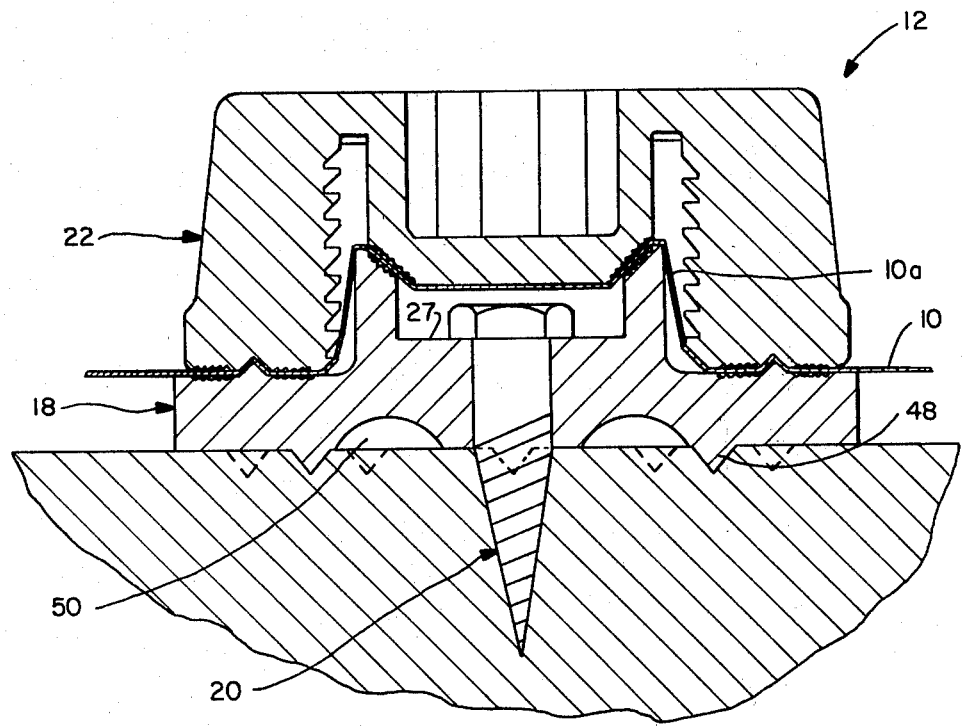
FIG.—2

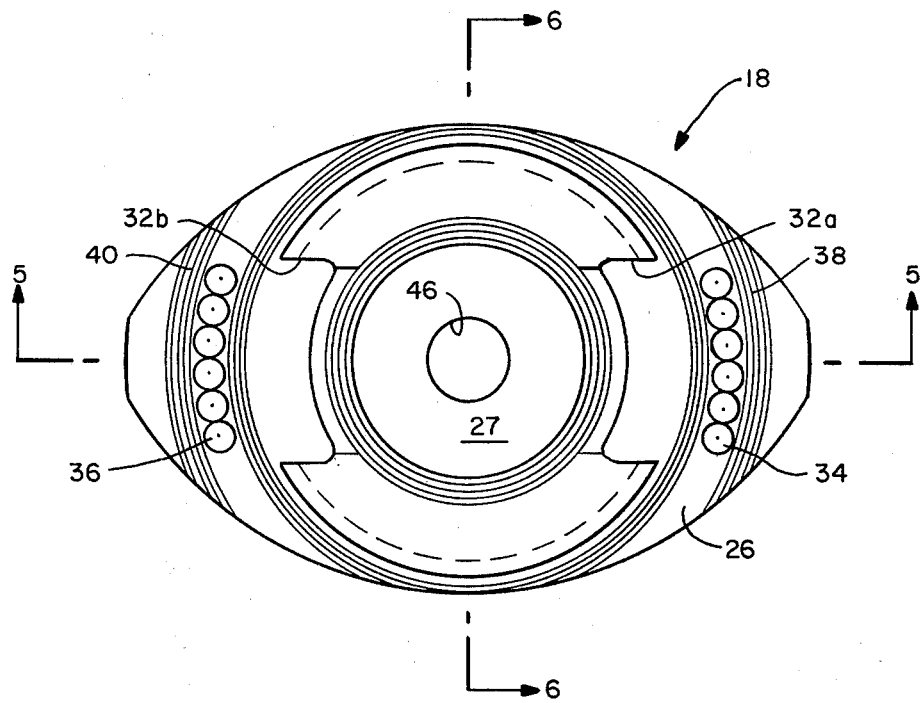
FIG.—3
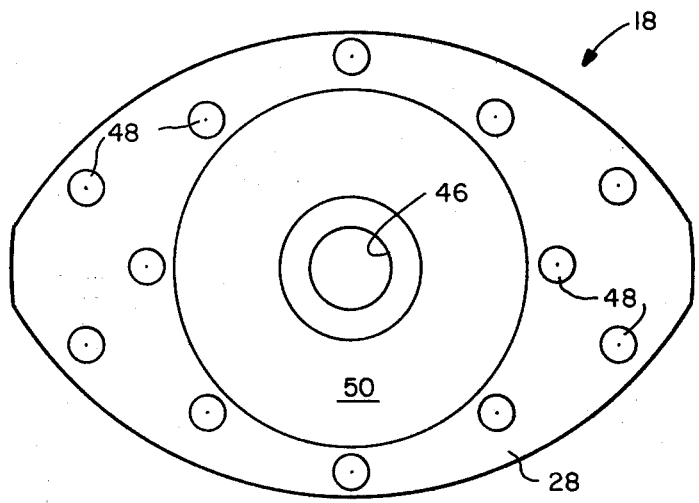
FIG.—4

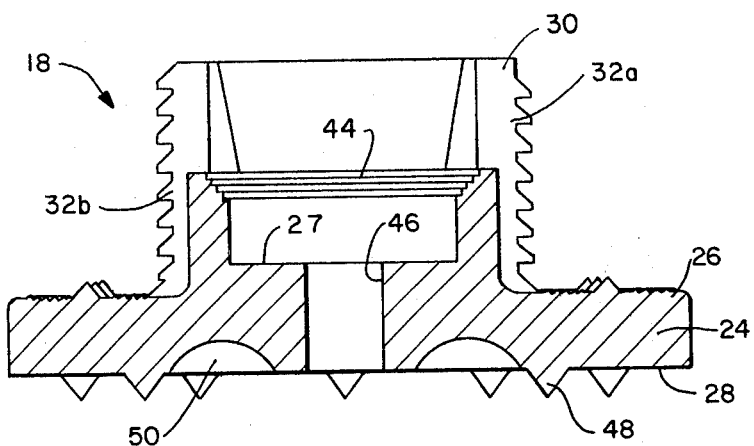
FIG.—5
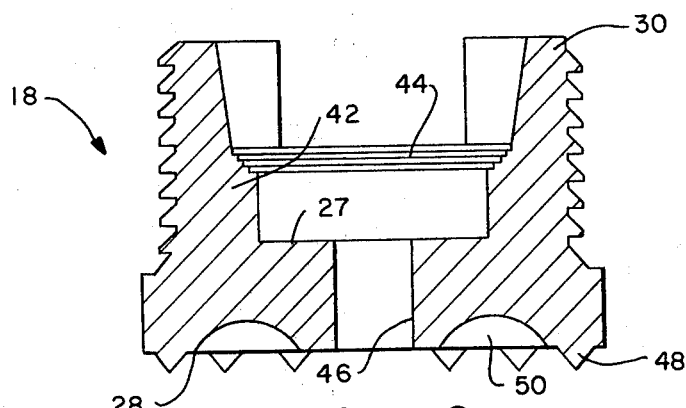
FIG.—6
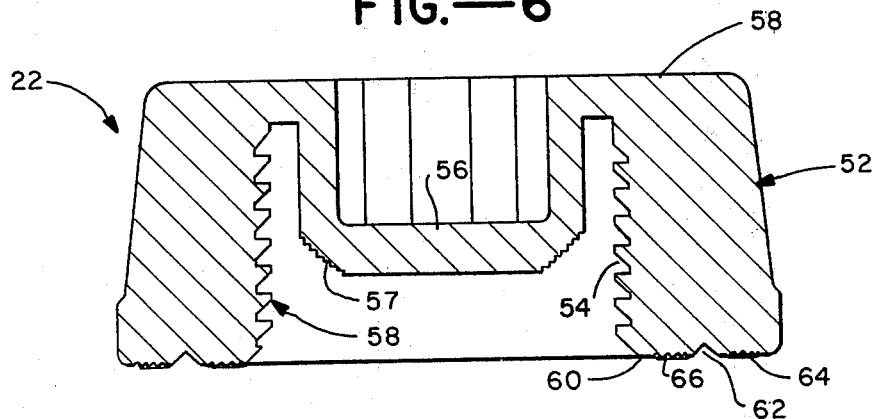
FIG.—7

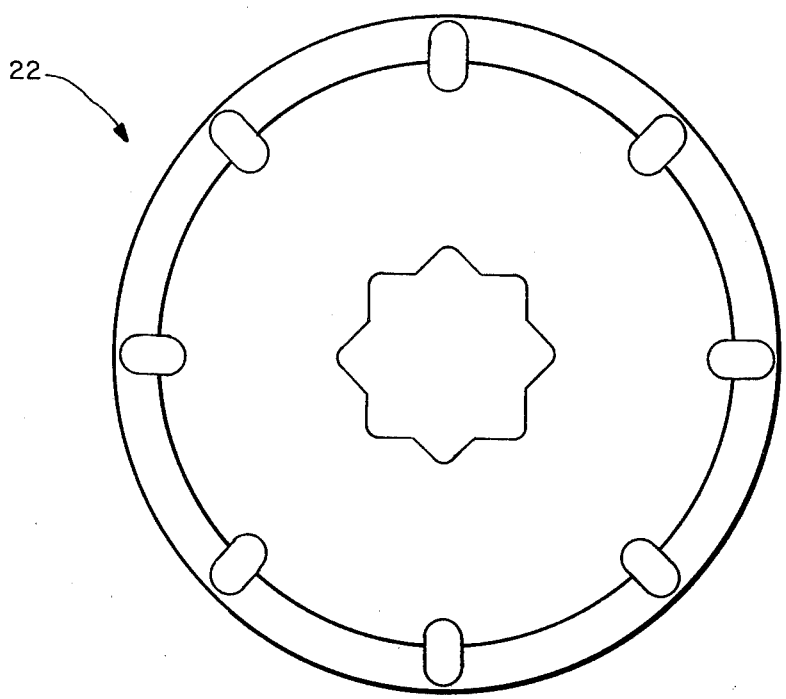
FIG.—8
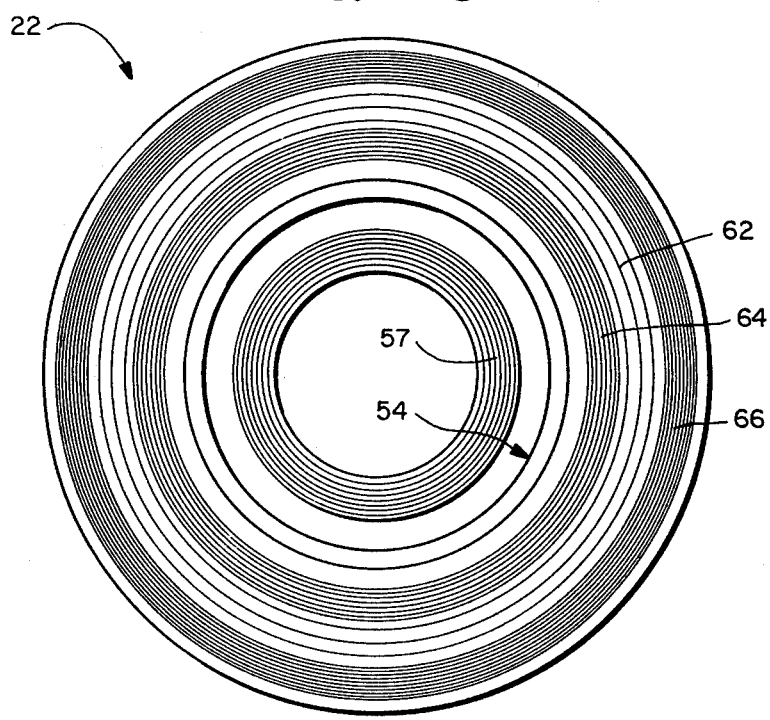
FIG.—9

TIEDOWN FASTENING DEVICE

The present invention relates generally to means for tying down one or more sections of a strap, cord or the like and more particularly to a specific tiedown device especially suitable for use in a support system serving to maintain one or more solar panels in position on a roof or other such support structure.

There are presently a number of ways to fasten or clamp down a wire, rope or the like including the utilization of two separate thread connected components as evidenced by the following U.S. Pat. Nos.:

418,369 Huff;
1,502,417 Arnstein;
1,964,448 Blackburn;
2,054,940 Lemont.

The Huff patent is directed to a screw cleat for electric wires and utilizes a slotted base for receiving the wire and a cap thread connected to the base for retaining the wire in place. The Arnstein patent is directed to a wire or rope clamp and is similar in function to the screw cleat in Huff. In Blackburn, a similar connector is shown for retaining one or more wires within a closed slot between a threaded bolt and cooperating nut. The Lemont patent is similar to all of the other patents to the extent that it includes a bolt and nut for interlocking one or more wires. The device in Lemont includes a pair of angled jaws to accomplish this.

As will be seen hereinafter, the tiedown device disclosed herein and designed in accordance with the present invention also includes two components, specifically a base and disengagably connected cap, for fastening down one section of a wire, cord or the like. However, as will also be seen, the tiedown device disclosed herein includes a number of improved features which make it especially suitable for tying down one or more sections of a strap comprising part of a support system for solar panels.

In view of the foregoing, one object of the present invention is to provide a tiedown device of the general type described above, that is, one which includes a base member and a disengageably connected cap and, specifically, a tiedown device including a number of improved features which make it especially reliable.

Another object of the present invention is to provide a tiedown device which is uncomplicated in design, economical to provide and easy to use.

A more specific object of the present invention is to provide a tiedown device which grips one section of a strap, cord or the like in particularly unique way for insuring that the strap section remains fastened in place.

Another specific object of the present invention is to provide a tiedown device which can be rapidly and reliably attached to a given support structure in an uncomplicated way.

Still another specific object of the present invention is to provide a tiedown device which preferably uses a screw, bolt or the like for attaching it to its support structure while at the same time eliminating the possibility of leakage at the point of attachment.

Yet another specific object of the present invention is to provide a tiedown device of the type just recited, that is, one which protects the screw, bolt or the like from ambient moisture for preventing corrosion.

A most specific object of the present invention is to provide a tiedown device which is especially suitable for use in a support system which serves to maintain one or more solar panels in place on a roof or the like.

As stated previously, the tiedown device disclosed herein is one which uses a base member which is to be fixedly attached to a given support structure, for example a roof, and a cap disengageably connected with the base member. However, in accordance with one aspect of the present invention, the base member and cap include confronting surface segments cooperating with one another for engaging and retaining one section of a strap or the like in a fixed position along a path having a plurality of bends when the base member and cap are connected in a predetermined way. This is to be contrasted with each of the devices disclosed in the above recited patents in which one section of a wire, rope or the like is retained in position along a substantially linear path. It is has been found that by providing multiple bends in the strap section being retained, especially four 90° bends as in an actual working embodiment of the present invention, the fastening capability of the device is improved significantly.

Other aspects of the tiedown device disclosed herein will become apparent herein as the device is described in detail in conjunction with the drawings wherein:

FIG. 1 is a diagrammatic illustration in perspective view of a system for supporting one or more solar panels in place on a given support structure, for example a roof, which uses a number of tiedown devices designed in accordance with the present invention;

FIG. 2 is a cross-sectional view of a tiedown device shown in place on a support structure for fastening down one section of a strap;

FIG. 3 is a plan view of the top side of a base member comprising part of the tiedown device of FIG. 2;

FIG. 4 is a plan view illustrating the underside of the base member shown in FIG. 3;

FIG. 5 is a sectional view of the base member of FIG. 3 taken generally along line 5—5 in FIG. 3;

FIG. 6 is a sectional view of the base member of FIG. 3 taken generally along line 6—6 in FIG. 3;

FIG. 7 is a cross-sectional view of a cap comprising part of the overall tiedown device of FIG. 2;

FIG. 8 is a plan view illustrating the top side of the cap of FIG. 7; and

FIG. 9 is a plan view illustrating the underside of the cap of FIG. 7.

Turning now to the drawings, wherein like components are designated by like reference numerals, attention is first directed to FIG. 1. This figure illustrates an arrangement of straps 10 and tiedown devices 12 which are used for supporting one or more solar panels 14 in place against a support surface, for example the top surface of a roof 16. As will be seen hereinafter, each of the tiedown devices 12 can be appropriately positioned on roof 16 and attached thereto before panels 14 are placed in position and before straps 10 are connected with the tiedown devices. Thereafter, the panel or panels can be placed in position, as shown in FIG. 1, and the straps can be connected to the tiedown devices for maintaining the panel or panels in place. This installation procedure is to be contrasted with a current method which first requires that the panels be properly positioned and then secured in place, one at a time. The present procedure has been found to be less complicated and faster than this previous method. While only one panel 14 is shown in solid lines in Figure one other adjacent panels could be readily held down by straps 10 and tiedown devices 12. A second such panel is shown by dotted lines at 14' with straps 10 extending over these panels, also indicated by dotted lines. Additional devices 12 (not shown) are provided for tying down the ends of straps 10 on the opposite side of panel 14.

The advantages resulting from using tiedown devices 12 for retaining panels 14 in place include the elimination of cutting straps and tying knots as will be seen hereinafter. Moreover, if a particular panel needs to be replaced, repaired, or removed the straps can be easily and rapidly removed. In addition, any given strap can be readily placed under more or less tension depending upon the need and a single tiedown device can be used to fasten down one or two straps so that the same tiedown device can be used for maintaining panel bodies or headers in place, as shown in FIG. 1. However, the most important aspect of the arrangement of straps and tiedown devices shown in FIG. 1 is the reliable way in which each tiedown device fastens down its associated strap section as will also be seen hereinafter.

Having described one preferred use for straps 10 and tiedown devices 12, attention is now directed to a detailed description of one of the tiedown devices. This device is shown in FIG. 2 in an operative position fixedly attached to roof 16 for fastening down one section 10a of a strap 10. As seen in FIG. 2, tiedown device 12 includes a base member 18, a screw 20 for fixedly attaching the base member to roof 16, and a cap 22 disengageably connected with the base member in a predetermined way. As will be described in more detail hereinafter and as seen in FIG. 2, the base and cap include confronting surface segments cooperating with one another for engaging and retaining strap section 10a in a fixed position along a path having a plurality of bends, specifically four substantially 90° bends, when the base member and cap are connected in the predetermined way, that is, the way shown in FIG. 2.

Turning now to FIGS. 3-6 in conjunction with FIG. 2, attention is directed to the detailed structure features of base member 18 which is preferably an integral unit formed of a reinforced polymeric material, such as, but not limited to 30% glass filled polypropylene. This base member includes a base 24 having a top side defining a horizontally extending, outer circumferential top side surface 26 (FIG. 3) and a horizontal underside 28 (FIG. 4), the latter being provided for positioning confronting relationship with the support surface of roof 16 or a like support structure. Base member 18 also includes an externally threaded, hollow stem 30 integrally formed with base 24 and extending vertically upward from inner periphery of topside surface 26 around a central topside surface 27. As best seen in FIG. 3, this stem includes a pair of vertical slots 32a and 32b which extend downward from its top end and stop short of top side surface 26, as best seen in FIG. 5. These two slots are spaced 180° from one another, that is on opposite sides of the center line of stem 30.

Returning to FIG. 2, it can be seen that base member 18 serves to support strap section 10a along a path which first extends substantially horizontally across one segment to topside surface 26, thereafter up to and through slots 32a and 32b across stem 30 just above the central topside surface 27 of base 24 and finally down to and substantially horizontally across a second segment of topside surface 26. It should be apparent that this path defines a plurality of bends, specifically four substantially 90° bends, as discussed previously. In a preferred and actual working embodiment, base 24 includes a first group of intergrally formed spikes 34 extending vertically upward from surface 26 laterally outward of slot 32a, as best seen in FIG. 3. The base also includes a second group of integrally formed spikes 36 extending vertically upward from topside surface 26 laterally outward of slot 32b, as best seen in FIG. 3. In addition, surface 26 includes elongated, slightly curved serrations 38 extending the length of and on opposite sides of spikes 34. Similar serrations 40 are provided in topside surface 26 on opposite sides of spikes 36. As will be seen hereinafter, the spikes 34, 36 and the serrations 38, 40 cooperate with cap 22 to improve the overall gripping capability of the tiedown device when the latter is maintained in the operating position of FIG. 2. To further increase this gripping capability, stem 30 includes an inner stem section 42 extending further inward then the rest of the stem and defining an upwardly directed, stepped shoulder 44 which circumscribes section 42 just below the bottom of slots 32a and 32b, as best seen in FIGS. 5 and 6 in conjunction with FIG. 3. As will be seen hereinafter this step shoulder cooperates with a complimentary step shoulder comprising part of cap 22 for further improving the gripping capability of tiedown device 12.

Having described most of base member 18, attention is now directed to the way the latter is attached to roof 16. As stated previously, this is accomplished by means of screw 20. As seen in FIG. 2, this screw extends trough base 24 from its top side to its underside, within stem 30. As best seen in FIGS. 5 and 6, a cooperating through hole 46 is provided for this purpose. As best seen in FIG. 2, the head of screw 20 is disposed well below stepped shoulder 44 within stem 30 and therefore does not interfere with strap section 10a as the latter passes between slots 32a and 32b. In a preferred embodiment, a single screw 20 comprises the entire attaching means for base member 28. As a result, base 24 includes a plurality of integrally formed spikes 48 extending downwardly therefrom (FIG. 4) and engaging against roof 16 (FIG. 2) in order to prevent the base member from rotating about screw 20 when cap 22 is thread connected to the latter. In addition, as best seen in FIG. 4, base 24 includes a circumferential groove 50 which circumscribes screw 20. This groove serves to receive a suitable sealant or O-ring which, in turn, provides a seal around the screw for preventing moisture from leaking down into the roof at the fastening point.

Having described base member 18 in its entirety and the way in which the base member is attached to roof 16 or any other suitable support structure, attention is now directed to the detailed structural features of cap 22 which, in a preferred embodiment, is an integrally formed unit constructed of a reinforced polymeric material, such as, but not limited to 30% glass filled polypropylene. As seen best in FIG. 7, cap 22 includes an outer circumferential section 52 including a threaded, vertically extending internal surface 54 for thread connecting the cap with and around the externally threaded stem 30 of base member 18 in the manner shown in FIG. 2. The cap also includes a downwardly extending inner section 56 integrally formed with the outer section by means of a circumferential connecting web 58. Inner section 56 is concentrically positioned within and spaced inwardly of integrally threaded surface 54 for insertion into stem 30 when the cap is connected with the base member, as seen in FIG. 2. In this way, certain segments of the cap cooperate with confronting segments of the base member for maintaining strap section 10a in position along the path. In this regard, in a preferred embodiment, outer section 52 of the cap includes a downwardly facing circumferential surface 60 which confronts the top side surface 26 when the cap is connected with the base member, as shown in FIG. 2, for gripping the segment of strap section 10a located therebetween. In a preferred embodiment, surface 60 is provided with a circumferential indent 62 and two groups of concentric serrations 64 and 66, one on each side of indent 62, as best seen in FIG. 9. An annular stepped shoulder 57 is provided as the lowermost outer corner of section 56. The circumferential indent 62 is vertically aligned above previously described spikes 34 and 36 and the serrations 64 and 66 are vertically aligned above the serrations 38 and 40 when the cap is connected with the bsse member as best seen in FIG. 2. At the same time, stepped shoulder 57 confronts stepped shoulder 44. This improves the gripping capability of the base member and cap along top side surface 26.

In addition to the foregoing, it should be apparent from FIG. 8, that cap 22 is provided with eight gripping knobs in its exterior surface to afford better hand tightening and loosening. An eight pointed socket has also been provided in the cap to allow tightening or loosening with a socket driver.

Having described all of the components making up tiedown device 12, it should be apparent from the foregoing and from FIG. 2 how this device fastens down section 10a of strap 10. The cooperating surfaces 26 and 70 maintain the horizontal segments of strap section 10a in place and provide enhanced gripping capabilities as a result of the opposing serrations, the upwardly directed spikes 34, 36 and the complementary indent 62. Further gripping is provided between shoulder 44 inside stem 30 and the bottom end of inner cap section 56. The steps forming shoulder 44 and the steps 57 provided around the bottom inner cap section 56 cooperate with one another for further increasing gripping capabilities.

It should be apparent that the tiedown device is capable of supporting more than one strap section 10a along the path shown in FIG. 2. While not entirely apparent, it is to be understood that the tiedown device could also support a section of a cross strap, that is, a strap extending normal to strap 10. In this case, it would be necessary to provide an additional pair of slots in stem 30. These additional slots would be located across from one another between the slots 32a and 32b but would otherwise be identical in size and shape. In addition, surface 26 would preferably include spikes and serrations similar to spikes 34, 36 and serrations 38, 40 at points laterally outwardly of the additional slots. In this regard, surface 26 would preferably extend further laterally outwardly than the distance shown in FIG. 3 so as to include the additional spikes and serrations.

What is claimed:

1. A device especially suitable for fastening down one section of a strap, comprising a base member, means for fixedly attaching said base member to a given support structure, and a cap disengageably connected with said base member in a predetermined way, said base member and cap including confronting surface segments cooperating with one another for engaging and retaining said strap section in a fixed position along a path having a plurality of bends when said base member and cap are connected in said predetermined way, at least some of said confronting surface segments including confronting stepped shoulders for gripping said strap segment.

2. A device according to claim 1 wherein said base member and cap include cooperating threaded segments for thread connecting said cap with said base member in said predetermined way.

3. A device according to claim 1 wherein said path includes four substantially 90° bends.

4. A device according to claim 1 wherein said base member includes a topside and a underside, the latter being provided for positioning in confronting relationship with said given structure and wherein said means for fixedly attaching said base member to said structure included a plurality of pointed spikes extending down from the underside of said base for engagement with said given support structure.

5. A device according to claim 4 wherein said attaching means consist essentially of said spikes and a single screw extending downwardly through a cooperating opening in said base from the topside of the latter to its underside.

6. A device according to claim 1 wherein said base member includes a topside and an underside, the latter being provided for positioning in confronting relationship with said given structure and wherein said attaching means includes a screw extending downwardly through a cooperating opening in said base from the topside of the latter to its underside, said underside including a circumferential groove which extends around said opening and which is adapted to receive a sealant or O-ring for sealing around said screw.

7. A device according to claim 1 wherein confronting at least some of said confronting surface segments of said base member and cap include serrations for gripping said strap segment.

8. A device according to claim wherein at least some of said confronting surface segments of said base member and cap respectively include outwardly protruding spikes and confronting indent means for gripping said strap segment.

9. A device especially suitable for fastening down one section of a strap, said device comprising:
   (a) a base member including a base having a top side defining a horizontally extending outer circumferential top side surface and a horizontal underside, the latter being provided for positioning in confronting relationship with a given support structure, and an externally threaded, hollow stem integrally formed with said base and extending vertically upward from the inner periphery of said top side surface, said stem including a pair of spaced vertical slots extending downward from its top end and stopping short of said top side surface whereby said base is adapted to support said strap section along a path which first extends substantially horizontally across one segment of said top side surface, up to and through said slots, and thereafter down to and substantially horizontally across a second segment of said top side surface so as to define a plurality of bends;
   (b) means including a screw extending through said base from its top side to its bottom side within said stem for attaching said base member to said support structure; and
   (c) a cap including an outer circumferential section having a threaded, vertically extending internal surface for thread connecting said cap with and around said externally threaded stem in a predetermined way, said outer section haivng a downwardly facing circumferential surface which confronts the top side surface of said base when said cap is connected with said base member in said predetermined way, and a downwardly extending inner section integrally formed with said outer section and concentrically positioned within said internally threaded surface for insertion into said stem when said cap is connected with said base member in said predetermined way, whereby said cap cooperates with said base for fixedly maintaining said strap section in position along said path.

10. A device according to claim 9 wherein said path includes four substantially 90° bends when said cap is connected with said base member in said predetermined way.

11. A device according to claim 10 wherein said attaching means consists essentially of said screw and a plurality of pointed spikes extending downward from the underside of said base for engagement with said given support structure whereby to prevent said base member from rotating about said screw when said cap is thread connected thereto.

12. A device according to claim 11 wherein the underside of said base includes a circumferential groove which extends around said screw and which is adapted to receive a sealant or O-ring for sealing around the latter.

13. A device especially suitable for fastening down one section of a strap, comprising a base member, means for fixedly attaching said base member to a given support structure, and a cap disengageably connected with said base member in a predetermined way, said base member and cap including confronting surface segments cooperating with one another for engaging and retaining said strap section in a fixed position along a path having a plurality of bends when said base member and cap are connected in said predetermined way, said confronting surface segments of said base member and cap respectively including outwardly protruding spikes and confronting indent means for gripping said strap segment by causing portions thereof directly over said spikes to be forced by the latter into the confronting indent means, said cap including a continuous circumferential groove serving as said indent means and all of said spikes being aligned with said recess.

* * * * *